Patented Feb. 15, 1938

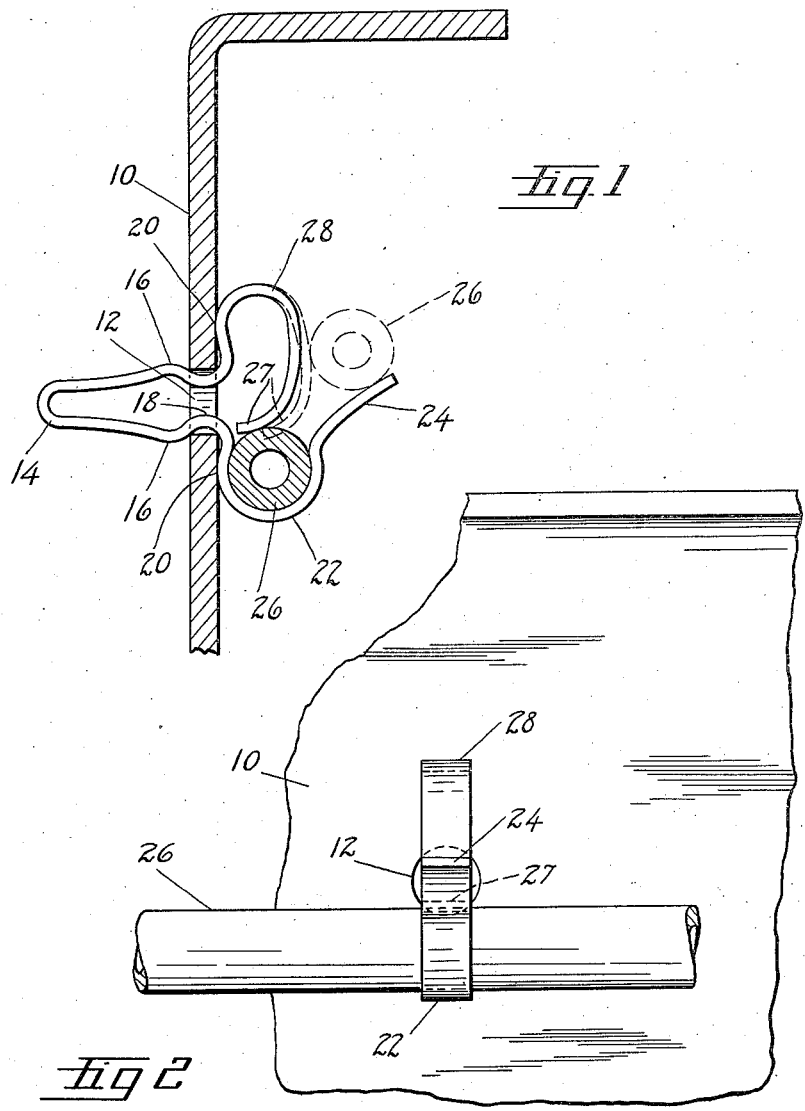

2,108,347

UNITED STATES PATENT OFFICE 2,108,347

TUBING CLIP

Bert L. Quarnstrom, Grosse Pointe Farms, Mich.

Application December 7, 1936, Serial No. 114,545

7 Claims. (Cl. 24—81)

This invention relates to a fastener particularly useful for the mounting of conduit or other elongated articles such as an electrical cable or conductor to a support, where a plurality of fasteners may be used along the length of the supported article. The fastener is one which has a particularly advantageous use in the mounting of tubing such as gas lines or oil lines or the like to the frame or other structural part of an automotive vehicle.

One object of the invention is the provision of a fastener of such structure that it can be fashioned advantageously from a length of spring material such as wire of various cross sectional shapes, as distinguished from a fastener stamped or otherwise formed from sheet metal stock. A fastener thus constructed may be made without any waste of material, except possibly for the percentage of rejected fasteners. In other words, a plurality of fasteners properly made can be fashioned from a length of spring wire stock without any waste of material. Also, the structure is such as to securely hold the article and to in turn securely fasten itself into an aperture in the support so that a strong permanent mounting for the article is obtained and looseness or rattling is prevented. The mounting is described as permanent in the sense that it is not liable to become loose, although it is possible to remove the article from the fastener and replace the same article or another article.

The fastener is fashioned into a portion which may be passed through an aperture in the support and which engages the support so as to be retained in the aperture. Another part of the length of spring material is fashioned into a main article embracing and holding part which may be in the form of a portion of a loop and which may have but a relatively small spring tendency, whereas another portion of the length of material is fashioned into a spring arm arranged to partially close the opening into the embracing loop, and to engage with spring tension, the article located in the loop.

Other objects, advantages, and meritorious features of this invention will more fully appear from the following description, appended claims, and accompanying drawing, wherein:

Figure 1 is a cross sectional view through a support showing my improved fastener therein in elevation, Fig. 2 is an elevation of a fragment of the structure shown in Fig. 1 taken at right angles thereto.

One particular use to which my improved fastener is adapted to be placed is that of securing a length of tubing to a frame member. Such constructions are common in automobile chassis work and in the drawing an apertured support in the form of a frame member is indicated as 10. This support is provided with an aperture 12. The spring fastener is formed of a strip or length of spring metal. It is here shown as being formed of a piece of wire stock of flat or ribbon form. It might be formed of wire of other shape in cross section, such as round or oval wire.

A suitable length of stock is bent upon itself forming a generally U-shaped element having a closed end 14. The two spring arms which make up such U-shape diverge as they extend away from the closed end 14 to a portion 16 of greater dimension than the closed end portion. From such point of divergence 16 the arms are then bent toward each other to form a contracted throat 18. Each arm is then bent away from the throat on an arc so that it abuts the support, as indicated at 20, at a point spaced from the aperture.

The free end of one arm is then bent upon itself to form a loop 22 and the outer end of such arm is bent outwardly angularly away from such loop as at 24 to afford free entrance into the loop 22. This loop is adapted to receive and embrace an elongate article such as a tube 26. The loop 22 is preferably formed to nicely fit the tube, and need not in itself be arranged to grip and hold the tube.

The opposite arm is bent upon itself to form a loop 28. Its normal position might be that shown in dotted outline in Fig. 1. The free end 27 of such arm partially closes the entrance to the loop 28 and projects toward the entrance to the loop 22 to obstruct such entrance so that the tube 26 may be forced through the entrance into the loop 22 against the tension of the free end 27 of the loop. The tube is moved through the tapering passageway formed by the free ends 24 and 27 of the two arms and against their yielding resistance into the loop 22 to be retained therein. When the tube is in position within the loop 22 the end of the arm which forms the loop 28 directly engages the tube as shown in solid line in Fig. 1 and holds the tube securely in place so that it cannot be withdrawn outwardly through the entrance except with difficulty. It will not move outwardly through such entrance as a result of accidental jar or shock.

This direct engagement of the end of the arm against the tube prevents the tube from becoming accidentally disengaged from the loop and holds it snugly within the loop and any pull tending to withdraw the tube directly through the passageway formed by the arm 28 and the end 24 of the other arm is resisted by the end of the arm 28.

When the tube is pushed into position through the tapering entrance-way, both the arm 24 and the portion 27 may be flexed because a considerable leverage is present due to the length of the arm 24 and the length of the arm 27. However, once the tube is received in the loop 22 there may be no further substantial flexing of the metal of this loop since the same contacts with the support as at 20 and since the loop closely embraces the tube. This provides a good solid load carrying structure. However, the end 27 is a considerable distance from the loop 28 and a cantilever action is afforded for substantial flexure of the end 27. This end of the wire urges the tube snugly into the loop so that it is held securely seated and at the same time partially closes the entrance way. The tube may be entered into the clip with less force than that required to remove it, because of the action of the tube on the inclined or curved surface of the arm 27, tending to flex it in a direction toward the frame 10. After the installation, however, any removal of the tube is required to work through a more difficult angle and it is not so easy to flex the part 27 toward the frame in this action, but to the contrary there is a considerable compression force between the loop 28 and the end 27. The clip itself may have such expansion qualities as to normally hold itself tight in the aperture. The presence of the tube, however, tends to separate portions of the clip by flexure at the bight portion 14, and thus the pressure of the engagement with the support is increased.

One advantage of this structure is that the article-engaging arms are not liable to be bent toward an open position beyond the elastic limit of the metal, as would be the tendency where the arms, or their free ends, extend a considerable distance from a support. Loop 22 is solidly supported by the frame 10 and is not liable to be bent away from the tube beyond the elastic limit of the metal. The end 27 which engages the tube with spring pressure is arranged so that the forces are directed more or less in line with the bend 28 and there is little tendency for the arm 27 to be sprung in a direction tending to open the clip.

What I claim is:

1. A spring fastener for securing a tube or the like to an apertured support comprising, a single length of spring material having a part fashioned to provide a securing portion adapted to be passed into the aperture for securing the fastener to the support, another portion of the material being fashioned to form an open loop-like part on one side of the aperture for receiving a tube, a further portion of the material being extended laterally on the side of the aperture opposite that of said loop, said last named portion having a substantially reverse bend therein, and a spring arm extending from the reverse bend toward the open side of the loop for partially closing the same, said spring arm adapted to flex for entrance of the tube into the loop and arranged to engage the tube with spring tension for holding the tube in the loop.

2. A spring fastener for securing a tube or the like to an apertured support comprising, a single length of spring material having a part formed to provide a securing portion adapted to be passed into the aperture for securing the fastener to the support, another portion of the material being fashioned to form an open loop-like part on one side of the aperture for receiving a tube, a further portion of the material being fashioned to engage the support on the side of the aperture opposite the said loop, said last named portion having a substantially reverse bend therein and a spring arm extending from the bend toward the open side of the loop for partially closing the loop, said spring arm adapted to flex for entrance of the tube into the loop and arranged to engage the tube with tension for holding the tube in the loop.

3. A spring fastener for securing a tube or the like to an apertured support comprising, a single length of spring material having a part formed to provide a securing portion adapted to be passed into the aperture for securing the fastener to the support, another portion of the material being fashioned to form an open loop-like part on one side of the aperture for receiving a tube, a further portion of the material being fashioned to engage the support on the side of the aperture opposite the said loop, said last named portion having a substantially reverse bend therein and a spring arm extending from the bend toward the open side of the loop in spaced relation as regards the support and terminating in spaced relation relative to said loop for partially closing the loop, said spring arm adapted to flex for entrance of the tube into the loop and arranged to engage the tube with tension for holding the tube in the loop.

4. A spring fastener for securing a tube or the like to an apertured support comprising, a single length of spring material having a part formed to provide a securing portion adapted to be passed into the aperture for securing the fastener to the support, another portion of the material being fashioned to form an open loop-like part on one side of the aperture for receiving a tube, one end of the material projecting from said loop, a further portion of the material being extended laterally on the side of the aperture opposite the said loop, said last named portion having a substantially reverse bend therein, the other end of the length of material extending from said reverse bend toward the open side of the loop and terminating substantially in the opening for partially closing the same, said two ends cooperating to define a tapering entrance-way for a tube and arranged to flex for entrance of the tube into the loop, the second mentioned end being arranged to partially close the open loop after the tube is located and to engage the tube with tension for holding it in the loop.

5. A spring fastener for securing a tube or the like to an apertured support comprising, a single length of spring material having a part fashioned to provide an expansible head portion adapted to be passed through the aperture and arranged to expand to hold the fastener in the aperture, another portion of the material being fashioned laterally to one side of the aperture to form an open tube-receiving loop, one side of which is in engagement with the support and which opens in a direction substantially paralleling the support and with the open side adjacent the aperture, a further portion of the material being fashioned laterally to engage the support on the side of the aperture opposite the said loop, said last named portion having a substantially reverse bend therein and having its extreme end portion extending from the reverse bend in spaced relation as regards the frame and terminating substantially in the opening of the loop for partially closing the same, said extreme end portion constituting a spring arm adapted to flex for entrance of the tube into the loop and arranged to engage the tube with tension for holding the tube in the loop.

6. A spring fastener for securing a tube or the like to an apertured support comprising, a single length of spring material having a part fashioned to provide an expansible head portion adapted to be passed through the aperture and arranged to expand to hold the fastener in the aperture, another portion of the material being fashioned laterally to one side of the aperture to form an open tube-receiving loop, one side of which is in engagement with the support and which opens in a direction substantially paralleling the support and with the open side adjacent the aperture, a further portion of the material being fashioned laterally to engage the support on the side of the aperture opposite the said loop, said last named portion having a substantially reverse bend therein and having its extreme end portion extending from the reverse bend in spaced relation as regards the frame and terminating substantially in the opening of the loop for partially closing the same, said extreme end portion constituting a spring arm adapted to flex for entrance of the tube into the loop and arranged to engage the tube with tension for holding the tube in the loop, the tension engagement with the tube serving to spread the said loop portion and the reverse bend portion and in turn tending to expand the securing portion of said aperture.

7. A spring fastener for securing a tube or the like to a support comprising, a single length of spring material formed with a bight portion in its intermediate zone with legs extending therefrom to provide a securing portion adapted to be passed through the aperture, said legs being shouldered for engaging in the aperture upon spreading of the legs, one portion of the length of material adjacent one end being fashioned laterally of the aperture to form a tube-receiving loop having an open side adjacent the aperture, said loop having one side in engagement with the support, the other end of the length of material being fashioned laterally to engage the support on the side of the aperture opposite the loop, said last named portion having a reverse bend and an end portion extending toward the loop and terminating substantially in the open side thereof for partially closing the same, said end portion adapted to flex for entrance of a tube into the loop and arranged to engage the tube with spring tension for holding the tube in the loop.

BERT L. QUARNSTROM.